INVENTOR
T. SLONCZEWSKI
BY
Walter M. Hill
ATTORNEY

Nov. 15, 1966  T. SLONCZEWSKI  3,286,169
COMBINED MAGNETOMETER AND GRADIOMETER
Filed June 22, 1962  2 Sheets-Sheet 2
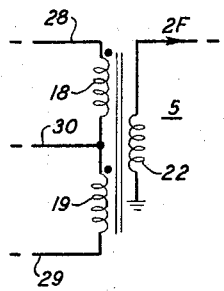
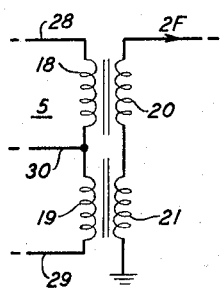
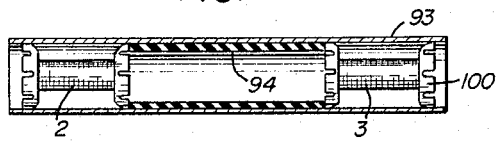
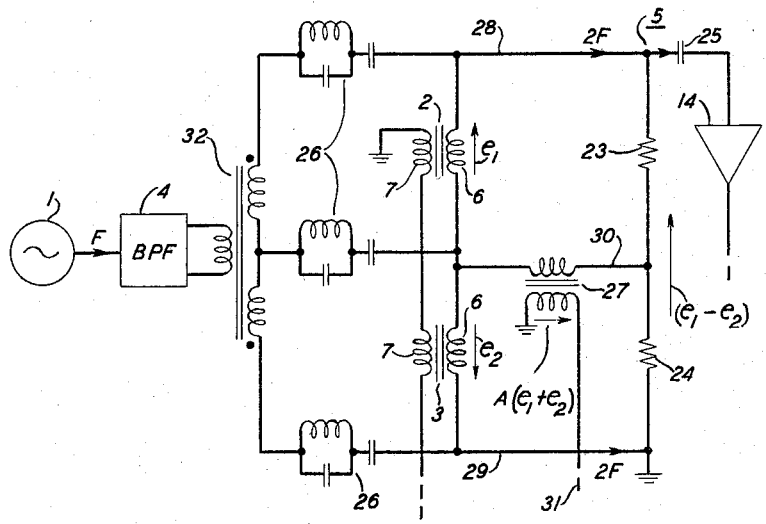
INVENTOR
T. SLONCZEWSKI
BY
Walter M. Hiel
ATTORNEY

United States Patent Office 3,286,169
Patented Nov. 15, 1966

3,286,169
COMBINED MAGNETOMETER AND
GRADIOMETER
Thaddeus Slonczewski, Summit, N.J., assignor to Bell
Telephone Laboratories, Incorporated, New York, N.Y.,
a corporation of New York
Filed June 22, 1962, Ser. No. 204,442
1 Claim. (Cl. 324—43)

This invention relates to magnetic detectors and more particularly to an improved gradiometer of the type disclosed in U.S. Patent 2,996,663, granted August 15, 1961, to J. G. Ferguson.

The improvement comprises, in part, the elimination of the average field detector located between the two gradiometer detectors and in the rearrangement of circuitry so that there is no loss of sensitivity or function by reason of this simplification.

An object of this invention is to measure an ambient magnetic field gradient as well as to provide a measure of the component of the ambient field itself which acts on the gradiometer.

Another object is to simplify and improve sensitive gradiometer circuits.

The foregoing objects are achieved by this invention which comprises two magnetic detectors of the saturable core, even-order harmonic type arranged as a gradiometer in fixed spatial relationship. These detectors are connected to a network which derives the sum and the difference of the voltages generated in the detectors in response to parallel components of the ambient magnetic field. The sum voltage is used in a feedback circuit to cancel a large part of the ambient field acting on the magnetometers while the difference voltage is applied to an indicator which indicates the field gradient.

The invention may be better understood by reference to the accompanying drawings, in which.

FIGS. 3 and 4 disclose alternative arrangements of transformers which may be used in the sum and difference network;

FIG. 5 discloses a still further embodiment of the invention which eliminates transformers in the sum and difference network; and FIG. 6 illustrates a typical arrangement for supporting the two detectors in fixed spatial relationship.

Figure 1:
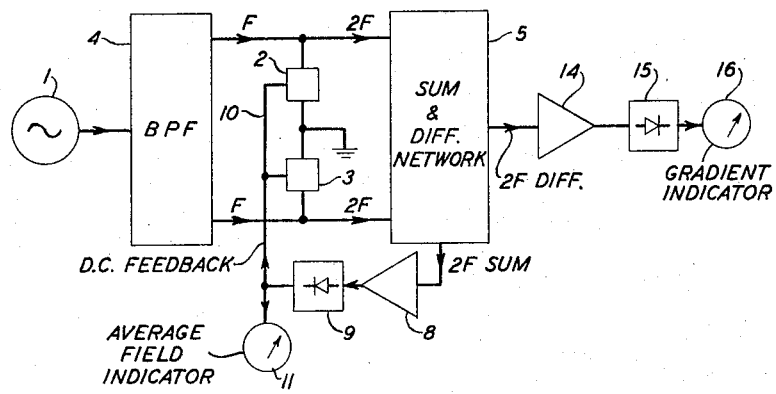
FIG. 1 is a block diagram disclosing broadly the essential elements of the invention.

FIG. 1 discloses two detectors 2 and 3 which are excited from a source of alternating current 1 of fundamental frequency F through a bandpass filter 4. Source 1 and filter 4 are of conventional construction, it being understood that the output circuits of filter 4 are arranged to reject the second harmonic which is generated in detectors 2 and 3. Detectors 2 and 3 are preferably of the same construction as disclosed in the above-noted Ferguson patent and correspond, respectively, to detectors 2 and 3 disclosed in that patent. The operation of these detectors is fully described in the patent and requires no further discussion in this application. For the purposes of this description, it need only be said that these detectors comprise a core of saturable magnetic material surrounded by one or more coils of wire. In the present case it is assumed that each detector is surrounded by two coils of wire, one of which is connected between ground and its conductor leading to filter 4. The fundamental frequency excites each core beyond saturation, generating therein only odd harmonics so long as there is no component of ambient magnetic field acting on the core parallel to its axis. Should such a component act on the core, even-order harmonics also appear. Of these, the second harmonic of frequency 2F is applied to the sum and difference network 5. The sum of these two voltages is derived in this network, is amplified by amplifier 8, rectified by rectifier 9 and applied to the second coils on the two detectors 2 and 3 in such a direction as to counteract the effect of the ambient field component. The circuit comprising amplifier 8, rectifier 9 and the second windings on the detectors is the feedback circuit and these second windings may be called the feedback windings. The effect of this feedback loop is to substantially nullify the effect of the ambient field component at the detectors. The purpose of this feedback is to improve the linearity of the detector response.

It will be evident that the sum voltage is substantially proportional to the average of the ambient fields acting at the two detectors and consequently the output of rectifier 9 may be observed by a meter 11 to indicate the average field.

The sum and difference network 5 has a second output proportional to the difference between the responses of the two detectors 2 and 3, this being amplified by amplifier 14, rectified by rectifier 15 and observed on meter 16. This difference voltage is proportional to the magnetic gradient existing between the two detectors.

From what has been said, it will be evident that all of the information available from the gradiometer system of the Ferguson patent is available from the gradiometer of this invention and that the information is obtained without the necessity of the intermediate average field detector necessary in the Ferguson circuit. This not only simplifies the construction but also materially reduces the effort involved in adjusting the detector coils to substantial parallelism.

Figure 2:
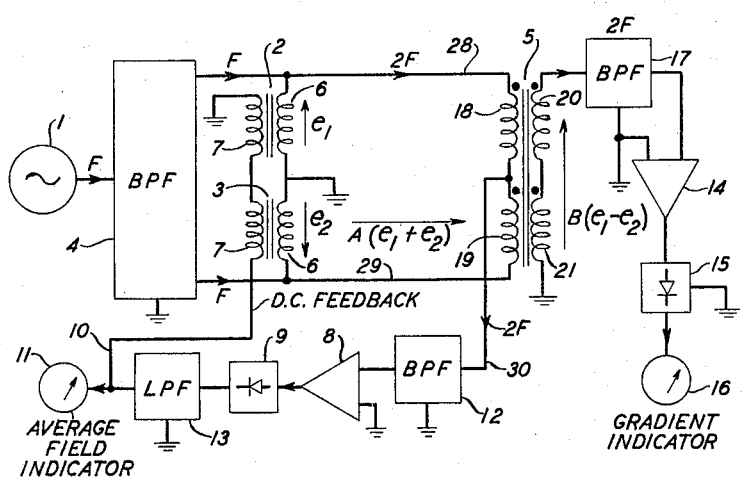
FIG. 2 shows the essential circuits of a preferred embodiment of the invention is greater detail.

The embodiment shown in FIG. 2 carries reference numerals corresponding to those shown in FIG. 1. In this figure detectors 2 and 3 are each shown as comprising a magnetic core with two windings 6 and 7. The two exciting coils 6 receive their energy of fundamental frequency from the two leads from the bandpass filter 4, the return being by way of ground. The coils 7 are the feedback coils. The sum and difference network 5 comprises a transformer having two primaries 18 and 19 and two secondaries 20 and 21. The primaries, as well as the secondaries, are connected series aiding as indicated by the dots above each of the coils. The outer terminals of the primaries are connected in series with the detector coils 6 by way of conductors 28 and 29. Since the two detector windings 6 are excited from the same source, they will develop second harmonic voltages of like phase with respect to ground when the two detectors are acted upon by an ambient field of the same polarity. The second harmonic voltages generated in coils 6, represented in FIG. 2 by the arrows $e1$ and $e2$, are those impressed on the two primary windings 18 and 19 so that the junction between these two windings will develop a voltage to ground $A(e1+e2)$ which is proportional to the sum of the two generated voltages. The junction between the two windings is connected to amplified 8 by way of conductor 30 and a second harmonic bandpass filter 12. After amplification, this voltage is rectified by rectifier 9 and the direct current component, passed by the lowpass filter 13, is applied to the two feedback windings 7 by way of conductor 10. Since this output voltage is proportional to the sum of the two voltages and, as previously stated, this voltage is proportional to the average field, it may be indicated by the average field indicator 11, also connected to the output circuit of filter 13.

The difference voltage is readily derived from the two secondary windings 20 and 21, it being remembered that these windings are also connected series aiding. This difference voltage arises by reason of the fact that voltages $e1$ and $e2$ are applied to the outer terminals of the two primary windings 18 and 19 in opposite phase, so that only their difference is effective across these windings. The resulting secondary voltage from windings 20 and 21 is applied to filter 17, is amplified by amplifier 14, rectified by rectifier 15 and observed on the gradient indicator 16.

FIG. 3 shows an alternative form of transformer arrangement for the sum and difference network in which only one winding 22 is used for the secondary. The operation is identical with that described for FIG. 2.

FIG. 4 shows a still further modification in which two separate transformers are used in the difference circuit. In this case, it is immaterial how the primaries are connected, it only being necessary that secondaries 20 and 21 be connected so as to give the difference voltage.

The transformers of FIGS. 3 and 4 may be substituted for the one shown in FIG. 2 in an obvious manner. In order that the outputs from circuit 5 will represent the true sum and difference, it is evident that primaries 18 and 19 should be substantially identical and the total impedance of the series circuit comprising the upper detector coil 6 and primary 18 should equal that of the lower detector coil and primary 19.

FIG. 5 discloses a gradiometer circuit in which the sum and difference is derived in a pair of substantially equal resistors 23 and 24 instead of by means of transformers. Since transformers inherently provide direct current isolation, it is necessary that the ground shown in FIG. 2 be removed from between the two gradiometer detectors 2 and 3 and placed at one end of the resistors as shown in FIG. 5 at the lower end of resistor 24. A transformer 32 must then be provided between the source and the detectors. The secondaries of this transformer should be poled as indicated in order to provide exciting voltages of proper phase to the two exciting windings 6. These voltages may be viewed as being of like phase with respect to the junction between the secondaries. The three networks 26 are resonant filters to provide low impedance to the fundamental frequency and substantially infinite impedance to the second harmonic. The second harmonic output voltages $e1$ and $e2$ developed in winding 6 of the detectors are thereby impressed in opposite phase only across serially connected resistors 23 and 24. The voltage appearing between the junction of these two resistors and the junction of windings 6 will be proportional to the sum of the generated voltages $e1$ and $e2$, while the difference between these two voltages appears between the upper end of resistor 23 and ground, i.e., across the two serially connected resistors. This difference voltage of second harmonic frequency is coupled to amplifier 14 through a capacitor 25 and thereafter to the gradient indicator in the manner shown in FIG. 2. In order to derive a sum voltage with respect to ground, it is convenient to use the transformer 27 with one terminal of its primary connected via conductor 30 to the junction between the two resistors and the other terminal connected to the junction between the two detector coils 6. The sum voltage appearing across the secondary is carried by way of conductor 31 to the feedback circuit as shown in FIG. 2, the output of which is applied to the two feedback coils 7 as before.

FIG. 6 discloses the mechanical structure of a typical arrangement for supporting the two detectors 2 and 3 in fixed spatial relationship. The reference numerals in this figure correspond with those of similar parts in FIGS. 6A and 6B of those of the above-cited Ferguson patent. As previously described, the intermediate detector element of the Ferguson patent has been eliminated. The two detector elements 2 and 3 are separated in fixed positions by a non-magnetic spacer 94 and this assembly is contained within a non-magnetic tube 93. The spool heads 100 are slotted so that they may be made to fit snugly within the tube 93 in the manner described in the Ferguson patent. It will be evident that this structure will maintain the principal axes of the two detector elements parallel and in fixed spatial relationship. Refined adjustments for obtaining more precise alignments are described in the Ferguson patent.

While this invention has been illustrated with a limited number of specific sum and difference networks, it will be evident to those skilled in the art that other types of such networks may be substituted therefor without departing from the scope of the invention. For example, an electrically isolated output coil on each of the detectors may be connected to a simple resistance bridge of the type shown in U.S. Patent 1,917,417, granted July 11, 1933, to T. Zuschlag. The sum and difference voltages are obtained from adjacent arms of the bridge. While the patent shows the alternating voltages rectified before applying to the conjugate bridge terminals, it is only a matter of design choice whether they are rectified before or after deriving the sum and difference voltages as it can be shown that the bridge also operates with alternating current.

What is claimed is:

A magnetic gradiometer circuit comprising two magnetic detector units, each unit being of the type comprising a core of saturable magnetic material having a principal magnetic axis about which coils are wound and in which alternating electromotive forces are generated having frequencies which are even order harmonics of a fundamental frequency current with which the core is excited, said generated harmonic electromotive forces being proportional to the component of ambient magnetic field parallel to said axis, means supporting said units in fixed spatial relationship with their principal magnetic axes parallel, a frequency selective network connected to said two detector units to derive therefrom one even order harmonic alternating voltage proportional to the sum of and another even order harmonic alternating voltage proportional to the difference between the said even order harmonic electromotive forces generated therein, said network comprising a pair of substantially equal resistors connected in series to form an accessible terminal therebetween, means connecting said detector units in series to form a junction therebetween and poled so that the said even order harmonic electromotive forces generated therein are of like phase with respect to said junction, means connecting said series connected detector units in series with said series connected resistors whereby said sum voltage may appear between said accessible terminal and said junction and the difference voltage may appear across said series connected resistors, an electromagnetic field nulling means on each detector unit, a feedback circuit coupling said network to said nulling means to nullify a substantial part of said ambient field at said detectors in proportion to said sum voltage, and a gradient indicator circuit also coupled to said network and responsive to said difference voltage.

References Cited by the Examiner

UNITED STATES PATENTS

| | | | |
|---|---|---|---|
| 2,485,847 | 10/1949 | Schmitt | 324—43 |
| 2,752,564 | 6/1956 | Ryerson | 324—43 |
| 2,996,663 | 8/1961 | Ferguson | 324—43 |

WALTER L. CARLSON, *Primary Examiner.*

RICHARD B. WILKINSON, *Examiner.*

F. A. SEEMAR, R. J. CORCORAN, *Assistant Examiners.*